(12) United States Patent
Miyatani et al.

(10) Patent No.: US 7,857,680 B2
(45) Date of Patent: *Dec. 28, 2010

(54) METHOD FOR PRODUCING GLASS SUBSTRATE FOR MAGNETIC DISK, AND MAGNETIC DISK

(75) Inventors: Katsuaki Miyatani, Chiyoda-ku (JP); Osamu Miyahara, Chiyoda-ku (JP); Yuzuru Tanabe, Chiyoda-ku (JP); Hiroshi Usui, Chiyoda-ku (JP); Yoshihisa Beppu, Chiyoda-ku (JP); Kazuo Sunahara, Chiyoda-ku (JP); Mitsuru Horie, Chiyoda-ku (JP); Satoshi Kashiwabara, Chiyoda-ku (JP); Tomohiro Sakai, Chiyoda-ku (JP); Yoshinori Kon, Chiyoda-ku (JP); Iori Yoshida, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 286 days.

This patent is subject to a terminal disclaimer.

(21) Appl. No.: 11/739,997

(22) Filed: Apr. 25, 2007

(65) Prior Publication Data
US 2007/0251270 A1 Nov. 1, 2007

(30) Foreign Application Priority Data
Apr. 28, 2006 (JP) ............................. 2006-125475
Sep. 27, 2006 (JP) ............................. 2006-262513

(51) Int. Cl.
*B24C 3/00* (2006.01)
*C01G 1/00* (2006.01)
*G11B 5/706* (2006.01)
*G11B 5/64* (2006.01)
*C03C 21/00* (2006.01)

(52) U.S. Cl. .................... 451/41; 428/848.9; 428/846.9; 423/155; 51/308; 451/443
(58) Field of Classification Search ................ 510/178; 438/690, 691, 692; 51/308, 309, 298; 216/88; 117/2; 65/30.14; 451/42, 41, 443; 428/846.9, 428/848.2, 848.6, 848.8, 323; 423/278, 155, 423/263

See application file for complete search history.

(56) References Cited

U.S. PATENT DOCUMENTS
5,766,279 A   6/1998   Ueda et al.
(Continued)

FOREIGN PATENT DOCUMENTS
CN   1288920 A   3/2001
(Continued)

OTHER PUBLICATIONS
Machine translation JP 2001-89749 (Apr. 2001).*
(Continued)

*Primary Examiner*—Kevin M. Bernatz
*Assistant Examiner*—Louis Falasco
(74) *Attorney, Agent, or Firm*—Oblon, Spivak, McClelland, Maier & Neustadt, L.L.P.

(57) ABSTRACT

A method for producing a glass substrate for a magnetic disk by polishing a circular glass plate, which comprises a step of polishing the principal plane of the circular glass plate by using a slurry containing a $CeO_2$ crystal powder, the $CeO_2$ crystal powder being obtained in such a manner that a melt containing $CeO_2$ is quenched to obtain an amorphous material, and the amorphous material is subjected to heat treatment to obtain a $CeO_2$ crystals-precipitated amorphous material, which is subjected to acid treatment to separate and extract the $CeO_2$ crystal powder from the $CeO_2$ crystals-precipitated amorphous material.

15 Claims, 1 Drawing Sheet

U.S. PATENT DOCUMENTS

Figure 1:
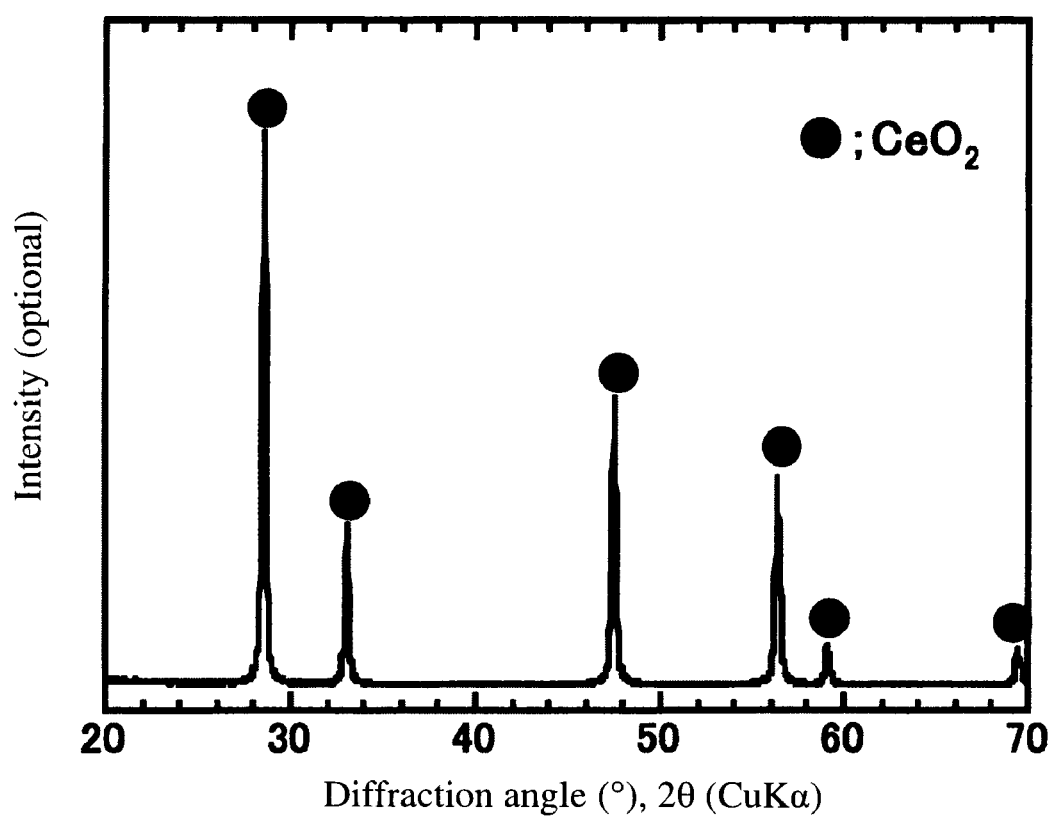

| | | | |
|---|---|---|---|
| 6,146,251 A * | 11/2000 | Fukui et al. | 451/42 |
| 6,224,464 B1 | 5/2001 | Nojo et al. | |
| 6,840,971 B2 | 1/2005 | Wang et al. | |
| 6,946,009 B2 | 9/2005 | Ito et al. | |
| 7,381,232 B2 * | 6/2008 | Beppu et al. | 51/309 |
| 2004/0028592 A1 * | 2/2004 | Akimoto et al. | 423/263 |
| 2004/0170820 A1 * | 9/2004 | Yadav et al. | 428/323 |
| 2004/0206296 A1 * | 10/2004 | Lee et al. | 117/2 |
| 2004/0241070 A1 * | 12/2004 | Noh et al. | 423/263 |
| 2005/0126080 A1 | 6/2005 | Kon et al. | |
| 2006/0032836 A1 * | 2/2006 | Feng et al. | 216/88 |
| 2006/0148667 A1 * | 7/2006 | Fukasawa et al. | 510/178 |

FOREIGN PATENT DOCUMENTS

| | | |
|---|---|---|
| JP | 2001-89749 | 4/2001 |
| JP | 2001-307320 | 11/2001 |
| JP | 2006-82138 | 3/2006 |
| WO | WO 2006/049197 A1 | 5/2006 |
| WO | WO 2006/103858 A1 | 10/2006 |

OTHER PUBLICATIONS

U.S. Appl. No. 11/745,024, filed May 7, 2007, Beppu, et al.
U.S. Appl. No. 11/765,702, filed Jun. 20, 2007, Usui, et al.
U.S. Appl. No. 12/609,247, filed Oct. 30, 2009, Horie, et al.

* cited by examiner

METHOD FOR PRODUCING GLASS SUBSTRATE FOR MAGNETIC DISK, AND MAGNETIC DISK The present invention relates to a method of polishing the principal plane of a glass substrate for a magnetic disk, and a magnetic disk.

Demand for high recording density of magnetic disks to be mounted on information processing devices such as hard disk drives is increasing in recent years, and under these circumstances, glass substrates are now widely used instead of conventional aluminum substrates.

However, demand for high recording density is increasingly high, and to meet such a demand, various proposals have been made with respect to a method of polishing the principal plane of a glass substrate with high precision (for example, JP-A-2006-82138).

The invention disclosed in JP-A-2006-82138 which is proposed as a method of polishing the principal plane of a glass substrate for a magnetic disk (hereinafter sometimes referred to simply as a glass substrate) with high precision, is to polish the principal plane by means of colloidal silica abrasive particles formed by hydrolyzing an organic silicon compound.

However, there may be a limitation in high precision polishing of the principal plane of a glass substrate by means of colloidal silica. For example, colloidal silica is used usually in a neutral state, but it is usually unstable in a neutral state and is likely to undergo agglomeration. Thus, dispersion of the surface precision on the principal plane is likely to occur.

Under these circumstances, it is an object of the present invention to provide a method of polishing the principal plane of a glass substrate with high precision without using colloidal silica.

The present invention provides a method for producing a glass substrate for a magnetic disk by polishing a circular glass plate, which comprises a step of polishing the principal plane of the circular glass plate by using a slurry containing a $CeO_2$ crystal powder, the $CeO_2$ crystal powder being obtained in such a manner that a melt containing $CeO_2$ is quenched to obtain an amorphous material, the amorphous material is subjected to heat treatment to obtain a $CeO_2$ crystals-precipitated amorphous material, which is subjected to acid treatment to separate and extract the $CeO_2$ crystal powder from the $CeO_2$ crystals-precipitated amorphous material.

The present invention further provides a magnetic disk comprising a plurality of layers including a magnetic layer to be a recording layer laminated on a glass substrate for a magnetic disk produced by the above method for producing a glass substrate for a magnetic disk.

The present inventors have found a novel method for producing a $CeO_2$ crystal powder having a small particle size and having high purity. They have used a $CeO_2$ crystal powder obtained by the production method to polish the principal plane of a glass substrate and as a result, found that high precision polishing is possible even without colloidal silica, and accomplished the present invention.

According to the present invention, the principal plane of a glass substrate can be polished with high precision without colloidal silica.

In the accompanying drawing:

FIG. 1 illustrates an X-ray diffraction pattern of a $CeO_2$ crystals-deposited amorphous material obtained in Preparation Example 5.

Now, the present invention will be described in detail with reference to the preferred embodiments.

According to the method for producing a glass substrate for a magnetic disk of the present invention (hereinafter referred to as the production method of the present invention), a glass substrate is produced usually by means of the following steps. Namely, a circular hole is put at the center of a circular glass plate, and chamfering, lapping of the principal plane and mirror polishing of the edge surface are sequentially carried out. Then, such circular glass plates thus processed are laminated, inner peripheral edge surfaces are etched, and the etched inner peripheral edge surfaces are coated with, for example, a polysilazane compound-containing liquid by e.g. spraying, followed by firing to form a coating film (protective coating film) on the inner peripheral edge surfaces. Then, the principal plane of each circular glass plate, on the inner peripheral edge surface of which a coating film is formed, is polished to be a flat and smooth surface, thereby to obtain a glass substrate for a magnetic disk.

The production method of the present invention is not limited to the above. For example, brush polishing may be applied to the inner peripheral edge surfaces instead of formation of a protective coating film on the inner peripheral edge surfaces; the principal plane lapping step may be divided into a coarse lapping step and a precise lapping step, and a shape-processing step (perforation at the center of the circular glass plate, chamfering and polishing of the edge surface) may be provided between the coarse and precise lapping steps, as disclosed in JP-A-2006-82138; or chemical tempering step may be provided after the principal plane polishing step. Needless to say, for production of a glass substrate having no circular hole at the center, perforation at the center of the circular glass plate is unnecessary.

The principal plane lapping is carried out usually by using alumina abrasive particles or metal oxide abrasive particles including alumina having an average particle size of from 6 to 8 μm.

The lapped principal plane is polished usually as follows.

First, the principal plane is polished by means of a slurry containing cerium oxide having an average particle size of from 0.9 to 1.8 μm and a urethane polishing pad. The loss of the plate thickness (removal amount) is typically from 30 to 40 μm.

Then, the principal plane is polished by means of a slurry containing cerium oxide having an average particle size of from 0.15 to 0.25 μm and a urethane polishing pad, so that Ra (arithmetical mean roughness) is from 0.4 to 0.6 nm for example and that the micro-waviness (Wa) measured in a range of 1 mm×0.7 mm under a condition of a wavelength range of $\lambda \leq 0.25$ mm by means of a three-dimensional surface structure analyzing microscope (e.g. NV200, manufactured by Zygo Co., Ltd.), is at most 0.2 nm for example. The loss of the plate thickness (removal amount) is typically from 1 to 2 μm.

Then, the principal plane is polished by means of a slurry containing the above $CeO_2$ crystal powder (hereinafter sometimes referred to simply as a $CeO_2$ crystal powder or a crystal powder) and a rigid urethane polishing pad for example, so that Ra is at most 0.25 nm for example and that Wa is at most 0.20 nm for example.

The average particle size (D) of the $CeO_2$ crystal powder measured by X-ray method is preferably at most 100 nm. If it exceeds 100 nm, Ra or Wa cannot be small, or scratches may form. It is more preferably at most 50 nm, particularly preferably at most 30 nm. Further, D is typically at least 5 nm, more typically at least 10 nm.

Measurement of D by X-ray method is well known and is carried out by using Scherrer Formula from the X-ray diffraction line broadening. Further, D means the crystallite diameter.

Now, a method of preparing the $CeO_2$ crystal powder is will be described mainly with reference to preferred embodiments.

A melt containing $CeO_2$ (hereinafter sometimes referred to simply as a melt) preferably contains from 5 to 50 mol % of $CeO_2$, from 10 to 50 mol % of at least one alkaline earth metal oxide selected from the group consisting of MgO, CaO, SrO and BaO in total, and from 30 to 75 mol % of $B_2O_3$.

Unless the melt has such a composition, its viscosity is not appropriate, or it is difficult to quench this melt to make it an amorphous material without crystallization. In a case where some of or the entire components volatize from the melt, the mixture before being melted differs from the amorphous material after being melted in the composition, and the composition here means the composition of the amorphous material after being melted.

If the $CeO_2$ content exceeds 50 mol %, the total content of the alkaline earth metal oxide (RO) is less than 10 mol % and the $B_2O_3$ content is less than 30 mol %, the melt is likely to be crystallized even when quenched, that is, it is difficult to vitrify the melt to make it an amorphous material. If the $CeO_2$ content is less than 5 mol %, in a case where RO content exceeds 50 mol % or in a case where the $B_2O_3$ content exceeds 75 mol %, $CeO_2$ crystals may not sufficiently be precipitated even when the amorphous material is subjected to heat treatment to precipitate the crystals.

In order that a desired $CeO_2$ crystal powder is more easily obtained or that the yield is higher, the melt more preferably contains from 20 to 40 mol % of $CeO_2$, from 10 to 40 mol % of RO and from 40 to 60 mol % of $B_2O_3$.

In order that the melt is more easily vitrified, the ratio of the content of RO represented by mol % to the content of $B_2O_3$ represented by mol % in the melt is preferably from 20:80 to 50:50, more preferably from 20:80 to 40:60.

In order that the melt is more easily vitrified or a desired $CeO_2$ crystal powder is more easily obtained, in the melt, the ratio of the content of $CeO_2$ represented by mol % to the sum of the content of the alkaline earth metal oxide(s) and the content of $B_2O_3$ represented by mol %, is preferably from 5:95 to 50:50, more preferably from 20:80 to 35:65.

The melt is obtained by blending various materials to obtain a desired composition, mixing them and melting the obtained mixture.

A material containing $CeO_2$ is preferably cerium oxide ($CeO_2$, $Ce_2O_3$) or cerium carbonate ($Ce_2(CO_3)_3 \cdot yH_2O$). At least one cerium compound selected from the group consisting of cerium chloride ($CeCl_3 \cdot yH_2O$), cerium nitrate ($Ce(NO_3)_3 \cdot yH_2O$), cerium sulfate ($Ce_2(SO_4)_3 \cdot yH_2O$), cerium (IV) diammonium nitrate ($Ce(NH_4)_2(NO_3)_6$) and cerium fluoride ($CeF_3$) may also be used (in the above formulae, y represents the hydration number, including the case of y=0). The $CeO_2$ material is considered to become a glass-forming component in collaboration with the after-mentioned RO material and the $B_2O_3$ material by melting.

The material containing an alkaline earth metal oxide is preferably an alkaline earth metal oxide itself or a carbonate ($RCO_3$). Further, at least one alkaline earth metal compound selected from the group consisting of a nitrate ($R(NO_3)_2$), a sulfate ($RSO_4$) and a fluoride ($RF_2$) of an alkaline earth metal may be used. In view of the solid solubility with $CeO_2$, the alkaline earth metal is preferably Ba or Sr.

A material containing $B_2O_3$ is preferably boron oxide ($B_2O_3$) or boric acid ($H_3BO_3$), or a borate of an alkaline earth metal may also be used.

Purity of the materials for the mixture is preferably at least 99%, more preferably at least 99.9% by the purity excluding the water of hydration.

The particle size of the materials for the mixture is not particularly limited so long as a homogeneous melt is obtained.

The mixture is obtained by dryly or wetly mixing the materials by means of a mixing/grinding means such as a ball mill or a planetary mill.

The mixture may be melted in the air atmosphere but is preferably melted while controlling the oxygen partial pressure and the oxygen flow rate.

Melting is carried out typically at 1,200° C. or above, preferably from 1,300 to 1,500° C.

Further, the mixture may be stirred during melting so as to increase homogeneity of the melt.

A crucible used for melting is preferably made of alumina, platinum or platinum containing rhodium, but may be made of a refractory material in some cases.

Heating is carried out preferably by using a resistance heating furnace, a high frequency induction furnace or a plasma-arc furnace.

The resistance heating furnace is preferably an electric furnace provided with a heating element made with a metal such as a nichrome alloy, or made of silicon carbide or molybdenum silicide.

The high frequency induction furnace is one provided with an induction coil and capable of controlling the output.

The plasma-arc furnace is one employing carbon or the like as an electrode, and utilizing the plasma-arc generated by the electrode.

Further, the mixture may be directly heated by infrared rays or by laser.

Further, the mixture may be melted as it is, or the mixture may be molded and then melted.

In the case of using a plasma-arc furnace, it is possible to mold the mixture, melt the molded mixture, and then quench the melt.

As a suitable method of quenching the melt to make it an amorphous material, a method of dropping the melt between twin rollers rotating at a high speed to obtain a flaky amorphous material, or a method of continuously winding a fibrous amorphous material (continuous fibers) from the melt by using a drum rotating at a high speed, may, for example, be mentioned. The twin rollers and the drum are ones made of a metal or a ceramic.

Further, a fibrous amorphous material (short fibers) may be obtained by using a spinner having pores provided on its side wall, rotating at a high speed.

By using such an apparatus, the melt can be quenched effectively to obtain a high purity amorphous material.

At the time of quenching, the temperature-lowering rate is at least $1 \times 10^{2\circ}$ C./sec for example, preferably at least $1 \times 10^{4\circ}$ C./sec.

In the case of a flaky amorphous material, it is preferred to quench the melt so that the thickness of the flakes is at most 200 µm. If the thickness exceeds 200 µm, the precipitation efficiency may be low when the amorphous material is subjected to heat treatment to precipitate $CeO_2$ crystals. The thickness is more preferably at most 100 µm.

In the case of a fibrous amorphous material, it is preferred to quench the melt so that the diameter of the fiber is at most 50 µm. If the diameter exceeds 50 µm, the precipitation efficiency may be low when the amorphous material is subjected to heat treatment to precipitate $CeO_2$ crystals. The diameter is more preferably at most 30 µm.

In a case where the precipitation efficiency is considered to be low since the thickness or the diameter of the flaky or fibrous amorphous material is large, it is preferred to pulverize the amorphous material, followed by heat treatment.

The heat treatment to precipitate $CeO_2$ crystals from the amorphous material is carried out preferably in the air atmosphere at from 600 to 900° C. e.g. in the case of the above preferred embodiment of the melt. If the temperature is less than 600° C., crystals may not sufficiently be precipitated even by heat treatment for 96 hours. The temperature is more preferably at least 650° C. If it exceeds 900° C., once precipitated crystals may be remelted. It is more preferably at most 850° C.

It is preferred to set the temperature at which the amorphous material is maintained depending upon the desired size of the crystals, since the size of the precipitated crystals tends to be large as the temperature at which the crystals are precipitated increases.

Crystal precipitation comprises two stages of nucleus formation and subsequent crystal growth. Thus, such heat treatment may be carried out that the melt is maintained sequentially at different temperatures, not maintained at the same temperature, so that the above two stages are carried out at different temperatures.

Crystals precipitated from the amorphous material by the heat treatment are mainly $CeO_2$ crystals, but depending upon the composition of the melt (composition of the amorphous material), a borate of an alkaline earth metal or $CeO_2$, or a double salt of an alkaline earth metal oxide and boric acid may be precipitated in addition. However, such a borate or a double salt are leached and removed by acid treatment to be carried out later.

The time period over which the heat treatment to precipitate the $CeO_2$ crystal is carried out, for example, the time period over which the amorphous material is maintained within a range of from 600 to 900° C. according to the above preferred embodiment, is preferably from 4 to 96 hours. If it is less than 4 hours, crystal precipitation may be insufficient. Typically, it is at least 8 hours. If it exceeds 96 hours, the size of the crystals may be too large. It is typically at most 32 hours.

The time period over which the heat treatment is carried out is preferably set depending upon the desired size of the crystals, since the crystal size tends to be large if the heat treatment time is long.

Acid treatment is carried out for the purpose of separating and extracting the $CeO_2$ crystals from the amorphous material in which the $CeO_2$ crystals are precipitated.

By this acid treatment, components other than the $CeO_2$ crystals are leached and removed. Some of the $CeO_2$ crystals may be leached and removed in some cases, which is rather preferred in a case where the size of the $CeO_2$ crystals is uniformalized.

The acid treatment is carried out typically by using at least one acid selected from the group consisting of acetic acid, hydrochloric acid, nitric acid, oxalic acid and citric acid.

In order to accelerate the removal by leaching, the acid may be heated, or the acid treatment may be carried out while applying ultrasonic waves.

A $CeO_2$ crystal powder is obtained by such acid treatment (leaching treatment), and as the case requires, washing with pure water may be carried out after the acid treatment.

Then, the obtained crystal powder is dispersed in a liquid medium to obtain a slurry.

The content of the crystal powder in the slurry should be properly selected considering the removal rate, uniform dispersibility, stability at the time of dispersing, etc., and it is preferably from 0.1 to 20% as represented by mass percentage. If it is less than 0.1%, the removal rate may be low, and if it exceeds 20%, the viscosity of the slurry tends to be high, whereby handling may be difficult in the polishing step. It is preferably at most 5%, typically from 0.5 to 5%.

Appropriate examples and inappropriate examples for preparation of the $CeO_2$ crystal powder will be described below.

PREPARATION EXAMPLES 1 TO 17

Cerium oxide ($CeO_2$), $RCO_3$ (R is Ba or Sr) and boron oxide ($B_2O_3$) were weighed in the proportion shown in Table 1 as represented by mol % based on $CeO_2$, RO and $B_2O_3$, respectively, a small amount of ethanol was added, and they were mixed and pulverized in an automatic mortar. Then, the mixture was dried to obtain a material powder (mixture).

The obtained material powder was put in a crucible with a nozzle, made of a platinum containing 10 mass % of rhodium, and heated in an electric furnace employing molybdenum silicide as a heating element at 1,500° C. for one hour so that the material powder was completely melted.

Then, the melt was dropped while the bottom of the nozzle of the crucible was heated in the electric furnace, and made to pass through twin rollers having a diameter of about 15 cm, rotating at 300 rpm to quench the droplets at a level of $1 \times 10^5$° C./sec to obtain a flaky solid. The obtained flakes were a brownish-red transparent amorphous material. The thickness of the flakes was measured by a micrometer and was from 30 to 50 μm.

Further, using some of the obtained flakes, the crystallization starting temperature was determined by differential scanning calorimetery (DSC).

The obtained flakes were held at a temperature shown in the column "crystallization temperature" in Table 1 for 8 hours to precipitate plate-like $CeO_2$ crystals in the flakes. The temperature shown in the column "crystallization temperature" was set to be higher than the crystallization starting temperature.

Then, the flakes after the crystallization temperature (heat treatment) were immersed in a 1 mol/L acetic acid solution at 70° C. for 20 hours to leach soluble materials.

The liquid after leaching was subjected to centrifugal separation, the supernatant was thrown away, and the residue washed with water and further dispersed under high pressure, dried, further washed with water, and dried to obtain fine particles having a particle size of from 5 to 100 nm.

The mineral phase of the obtained fine particles was identified by a X-ray diffraction apparatus. As a result, the fine particles were cubic crystals, the obtained peak agreed with a known diffraction peak of $CeO_2$, and the obtained fine particles were found to be particles with high crystallinity consisting of a $CeO_2$ single phase. The X-ray diffraction pattern of the fine particles obtained in Preparation Example 5 is shown in FIG. 1.

Further, the average primary particle size (crystallite diameter) was calculated based on the Scherrer formula from the X-ray diffraction line broadening. As is evident from Table 1, the particle size of the obtained fine particles is very small in each Preparation Example.

TABLE 1

|  | Chemical composition (mol %) | | | Crystallization temperature (° C.) | Crystallite diameter (nm) |
| --- | --- | --- | --- | --- | --- |
|  | $CeO_2$ | RO | $B_2O_3$ |  |  |
| Prep. Ex. 1 | 10.0 | 30.0 BaO | 60.0 | 800 | 70 |
| Prep. Ex. 2 | 10.0 | 45.0 SrO | 45.0 | 700 | 16 |

TABLE 1-continued

| | Chemical composition (mol %) | | | Crystallization temperature | Crystallite diameter |
|---|---|---|---|---|---|
| | $CeO_2$ | RO | $B_2O_3$ | (° C.) | (nm) |
| Prep. Ex. 3 | 20.0 | 40.0 SrO | 40.0 | 700 | 14 |
| Prep. Ex. 4 | 20.0 | 26.7 BaO | 53.3 | 800 | 73 |
| Prep. Ex. 5 | 25.0 | 25.0 BaO | 50.0 | 750 | 42 |
| Prep. Ex. 6 | 25.0 | 12.5 SrO + 12.5 BaO | 50.0 | 800 | 72 |
| Prep. Ex. 7 | 25.0 | 25.0 SrO | 50.0 | 800 | 62 |
| Prep. Ex. 8 | 33.3 | 22.2 BaO | 44.4 | 750 | 41 |
| Prep. Ex. 9 | 20.0 | 16.0 BaO | 64.0 | 800 | 65 |
| Prep. Ex. 10 | 25.0 | 15.0 BaO | 60.0 | 850 | 85 |
| Prep. Ex. 11 | 33.3 | 13.3 BaO | 53.3 | 850 | 89 |
| Prep. Ex. 12 | 33.3 | 6.7 SrO + 6.7 BaO | 53.3 | 850 | 73 |
| Prep. Ex. 13 | 33.3 | 13.3 SrO | 53.3 | 850 | 99 |
| Prep. Ex. 14 | 40.0 | 20.0 SrO | 40.0 | 800 | 55 |
| Prep. Ex. 15 | 40.0 | 12.0 SrO | 48.0 | 800 | 48 |
| Prep. Ex. 16 | 40.0 | 10.0 SrO + 10.0 BaO | 40.0 | 800 | 60 |
| Prep. Ex. 17 | 40.0 | 6.0 SrO + 6.0 BaO | 48.0 | 800 | 52 |

PREPARATION EXAMPLES 18 TO 24

Fine particles were obtained in the same manner as in Preparation Example 1 except that the chemical composition of the mixture was changed to the proportion shown in Table 2 and that the flakes were heated at the crystallization temperature shown in Table 2 for 8 hours. The mineral phase of the obtained fine particles was identified in the same manner as in Preparation Example 1 and as a result, the fine particles were particles with high crystallinity consisting of a $CeO_2$ single phase. Further, the crystallite diameter of the obtained fine particles was measured in the same manner as in Preparation Example 1 and as a result, the crystallite diameter was very small in each Preparation Example as is evident from Table 2. Further, an increase of the crystallite diameter along with the increase of the crystallization temperature (heat treatment temperature) was confirmed.

TABLE 2

| | Chemical composition | Crystallization temperature (° C.) | Crystallite diameter (nm) |
|---|---|---|---|
| Prep. Ex. 18 | Same as Prep. Ex. 5 | 670 | 15 |
| Prep. Ex. 19 | Same as Prep. Ex. 5 | 700 | 24 |
| Prep. Ex. 20 | Same as Prep. Ex. 5 | 720 | 30 |
| Prep. Ex. 21 | Same as Prep. Ex. 5 | 800 | 58 |
| Prep. Ex. 22 | Same as Prep. Ex. 11 | 710 | 46 |
| Prep. Ex. 23 | Same as Prep. Ex. 11 | 770 | 60 |
| Prep. Ex. 24 | Same as Prep. Ex. 13 | 720 | 46 |

PREPARATION EXAMPLE 25

Inappropriate Example

The melt obtained by carrying out the mixing and pulverization operation and the melting operation in the same manner as in Preparation Example 5, was quenched in the electronic furnace to room temperature at a rate of 300° C./h, whereupon an opaque solid was formed and no amorphous material was obtained.

PREPARATION EXAMPLES 26 AND 27

Inappropriate Examples

Cerium oxide ($CeO_2$), barium carbonate ($BaCO_3$) and boron oxide ($B_2O_3$) were weighed in the proportion shown in Table 3 represented by mol % based on $CeO_2$, BaO and $B_2O_3$, respectively, and the mixing and pulverization operation and the melting operation were carried out in the same manner as in Preparation Example 5, whereupon an opaque solid was formed and no amorphous material was obtained.

PREPARATION EXAMPLES 28 AND 29

Inappropriate Examples

Cerium oxide ($CeO_2$), barium carbonate ($BaCO_3$) and boron oxide ($B_2O_3$) were weighed in the proportion shown in Table 3 represented by mol % based on $CeO_2$, BaO and $B_2O_3$, respectively, and the mixing and pulverization operation, the melting operation and the quenching operation were carried out in the same manner as in Preparation Example 1, whereupon transparent flakes were obtained. The crystallization operation and the leaching operation were carried out in the same manner as in Preparation Example 1, but substantially no crystalline $CeO_2$ fine particles were obtained.

TABLE 3

| | Chemical composition (mol %) | | |
|---|---|---|---|
| | $CeO_2$ | BaO | $B_2O_3$ |
| Prep. Ex. 26 | 60.0 | 10.0 | 30.0 |
| Prep. Ex. 27 | 60.0 | 20.0 | 20.0 |
| Prep. Ex. 28 | 3.0 | 32.3 | 64.7 |
| Prep. Ex. 29 | 5.0 | 10.0 | 85.0 |

Now, a slurry will be described below.

To disperse the crystal powder in a liquid medium, the crystal powder is preferably pulverized and then dispersed, more preferably the crystal powder is wetly pulverized using the liquid medium.

Pulverization or dispersion of the crystal powder is carried out, for example, by using a dry jet mill, a ball (bead) mill or a planetary mill in which powder particles collide with one another at high speed, a high pressure homogenizer in which a plurality of fluids collide with one another, or an ultrasonic application apparatus.

Further, filtration treatment by a filter or centrifugal separation may be carried out to remove agglomerated particles or coarse particles.

With respect to the slurry, the median diameter ($D_{50}$) of particles in the slurry is preferably from 10 to 300 nm as measured by dynamic light scattering method. If it is less than 10 nm, the removal rate may be low, and if it exceeds 300 nm, the surface precision such as Ra or Wa may be low. It is more preferably from 20 to 200 nm, particularly preferably at most 80 nm.

Then, the liquid (liquid medium) constituting the slurry will be described.

The liquid is usually water, but various components may be incorporated as the case requires. The pH of the slurry is preferably from 5 to 12. If it is less than 5, the particles may agglomerate. It is more preferably at least 6. If it exceeds 12, there may be a problem about handling.

The various components may, for example, be as follows.

At least one alcohol selected from the group consisting of methanol, ethanol, propanol, ethylene glycol and propylene glycol may be incorporated for the purpose of increasing the polishing properties and dispersion stability.

A water-soluble organic polymer having carboxylic acid groups or carboxylate groups may be incorporated for the purpose of adjusting the surface tension, adjusting the viscosity or improving the dispersion stability.

Such a water-soluble organic polymer may, for example, be at least one water-soluble organic polymer selected from the group consisting of a polyacrylic acid, an ammonium polyacrylate, a sodium polyacrylate, a polymethacrylic acid, an ammonium polymethacrylate, a sodium polymethacrylate, a polyamide, a polyamic acid ammonium salt and a polyamic acid sodium salt.

The water-solubility may be of any degree so long as the polymer is completely dissolved in the abrasive liquid as visually observed at a concentration at which the liquid is used as an abrasive. Usually, water-solubility means that at least 5 mass % of the polymer is dissolved in pure water, preferably at least 30 mass %.

A water-soluble organic polymer having vinyl groups may be incorporated for the purpose of adjusting the surface tension or adjusting the viscosity.

Such a water-soluble organic polymer may, for example, be a polyvinyl alcohol or a polyvinyl pyrrolidone.

A water-soluble organic polymer having amino groups, amine salt groups or quaternary ammonium salt groups (hereafter such a water-soluble organic polymer will be referred to as polymer A) may be incorporated for the purpose of imparting selectivity in difference in level at the time of polishing. It is considered that protrusions of the irregularities tend to be selectively abraded to lower Ra, since each polymer A has amino groups or amine salt groups which are likely to adhere to silicate glass.

In a case where at least one polymer A is incorporated, its content in the slurry is preferably from 0.001 to 10 mass % in total. If it is less than 0.001 mass %, Ra may not sufficiently be small. It is more preferably at least 0.1 mass %, particularly preferably at least 0.5 mass %. If it exceeds 10 mass %, the removal rate may remarkably decrease. It is more preferably at most 5 mass %.

The water-soluble organic polymer having amino groups (hereinafter referred to as a water-soluble polyamine) may be any polymer so long as it is a water-soluble compound having at least two amino groups in one molecule. Typically, it is at least one water-soluble polymer selected from the group consisting of a polyamide amine, a polyetheramine and an aliphatic polyamine, or at least one water-soluble polymer selected from the group consisting of a water-soluble polyether polyamine, a water-soluble polyalkylene polyamine, a polyethyleneimine, a water-soluble polyvinylamine, a water-soluble polyallylamine, a water-soluble polylysine and a water-soluble chitosan. A particularly preferred water-soluble polyamine is a water-soluble polyether polyamine or a water-soluble polyalkylene polyamine.

The molecular weight of the water-soluble polyamine is not particularly limited so long as the polyamine is water-soluble, but it is preferably from 100 to 100,000, more preferably from 100 to 2,000, by the weight average molecular weight. If the weight average molecular weight is less than 100, the effect of the water-soluble polyamine tends to be small. If it exceeds 100,000, even though the polyamine is water-soluble, it may adversely affect physical properties of the abrasive such as fluidity. If the water average molecular weight exceeds 2,000, solubility in pure water decreases in many cases. A particularly preferred water-soluble polyamine is a water-soluble polyether polyamine or a water-soluble polyalkylene polyamine having a weight average molecular weight of from 100 to 2,000.

The above polyether polyamine is a compound having at least two amino groups and at least two etheric oxygen atoms. The amino group is preferably a primary amino group (—$NH_2$). The polyether polyamine may have a secondary amino group (—NH—) or a tertiary amino group as amino groups, but the polyether polyamine in the present invention is preferably a compound having at least two primary amino groups and having substantially no other amino groups, particularly preferably a polyether diamine having two primary amino groups alone. The polyether polyamine is preferably a compound having such a structure that a hydrogen atom of a hydroxyl group in a polyhydric alcohol or a polyether polyol substituted by an aminoalkyl group. The polyhydric alcohol is preferably a dihydric to hexahydric alcohol, particularly preferably a dihydric alcohol, and the polyether polyol is preferably a dihydric to hexahydric polyoxyalkylene polyol, particularly preferably a polyoxyalkylene diol. The aminoalkyl group is preferably a $C_{2-6}$ aminoalkyl group such as a 2-aminoethyl group, a 2-aminopropyl group, a 2-amino-1-methylethyl group, a 3-aminopropyl group, a 2-amino-1,1-dimethylethyl group or a 4-aminobutyl group.

The polyhydric alcohol is preferably a $C_{2-8}$ dihydric alcohol which may have an etheric oxygen atom, such as ethylene glycol, diethylene glycol, propylene glycol or dipropylene glycol. The polyether polyol is preferably a polyether diol of which the repeating unit is a $C_{2-6}$ oxyalkylene group, such as a polyethylene glycol (i.e. polyoxyethylene diol) such as triethylene glycol or tetraethylene glycol, a polypropylene glycol (i.e. polyoxypropylene diol) such as tripropylene glycol or tetrapropylene glycol, or a polyoxyalkylene diol having at least two types of oxyalkylene groups, such as poly(oxypropylene/oxyethylene) diol.

The polyalkylene polyamine is a compound having at least three amino groups bonded via an alkylene group. Preferably, the terminal amino group is a primary amino group and the amino group in the interior of the molecule is a secondary amino group. More preferred is a linear polyalkylene polyamine having a primary amino group at both molecular terminals and having at least one secondary amino group in the interior of the molecule. At least three bonding moieties consisting of an alkylene group, sandwiched between an amino group and another amino group, exist in one molecule, and such a plurality of bonding moieties between amino groups may be the same or different. Preferably, all these moieties are the same, or two bonding moieties between amino groups bonded to the primary amino group at both terminals are the same and the other bonding moiety between amino groups is different. One bonding moiety between amino groups preferably has from 2 to 8 carbon atoms, particularly preferably each of the two bonding moieties between amino groups bonded to the primary amino group at both terminals has from 2 to 8 carbon atoms and the other bonding moiety between amino groups has from 2 to 6 carbon atoms.

Each of the polyether diamine and the polyalkylene polyamine is preferably a compound having a structure of the following formula (1):

$$H_2N-(R-X-)_k-R-NH_2 \quad (1)$$

wherein R is a $C_{2-8}$ alkylene group, X is an oxygen atom or —NH—, and k is an integer of at least 2 in the case of a polyether diamine or an integer of at least 1 in the case of a polyalkylene polyamine, provided that a plurality of R's in one molecule may be different.

Particularly, the polyether diamine is preferably a compound having a structure of the following formula (2), and the polyalkylene polyamine is preferably a compound having a structure of the following formula (3):

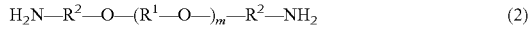
$$H_2N-R^2-O-(R^1-O-)_m-R^2-NH_2 \quad (2)$$

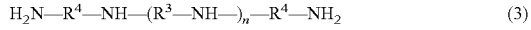
$$H_2N-R^4-NH-(R^3-NH-)_n-R^4-NH_2 \quad (3)$$

wherein $R^1$ is an ethylene group or a propylene group, $R^2$ is a $C_{2-6}$ alkylene group, $R^3$ is a $C_{2-6}$ alkylene group, $R^4$ is a $C_{2-8}$ alkylene group, m is an integer of at least 1, and n is an integer of at least 1, provided that $R^1$ and $R^2$ may be the same or different, and $R^3$ and $R^4$ may be the same or different.

Specifically, the polyether diamine of the formula (2) may, for example, be a polyoxypropylene diamine (a compound wherein $R^1$ and $R^2$ are propylene groups and m is at least 1), polyoxyethylene diamine (a compound wherein $R^1$ and $R^2$ are ethylene groups and m is at least 1), or 4,7,10-trioxa-tridecane-1,13-diamine (a compound wherein $R^1$ is an ethylene group, $R^2$ is a trimethylene group and m is 2). Specifically, the polyalkylene polyamine of the formula (3) may, for example, be tetraethylenepentamine (a compound wherein $R^3$ and $R^4$ are ethylene groups and n is 2), pentaethylenehexamine (a compound wherein $R^3$ and $R^4$ are ethylene groups and n is 3), heptaethyleneoctamine (a compound wherein $R^3$ and $R^4$ are ethylene groups and n is 5), N,N'-bis(3-aminopropyl)-ethylenediamine (a compound wherein $R^3$ is an ethylene group, $R^4$ is a trimethylene group and n is 1), or N,N'-bis(2-aminoethyl)-1,4-butanediamine (a compound wherein $R^3$ is a tetramethylene group, $R^4$ is an ethylene group and n is 1).

The water-soluble organic polymer having amine salt groups may, for example, be a coconut amine, a hardened beef tallow amine, a rosin amine or an ethylene oxide-addition type higher alkyl amine.

The water-soluble organic polymer having quaternary ammonium salt groups may, for example, be a polymer wherein the quaternary ammonium salt groups are an ethylene oxide addition type quaternary ammonium salt or a diquaternary ammonium salt.

For the purpose of adjusting the pH, at least one pH adjuster selected from the group consisting of phosphoric acid, acetic acid, propionic acid, malonic acid, succinic acid, glutaric acid, adipic acid, maleic acid, fumaric acid, phthalic acid, citric acid, ethylenediamine, pyridine, 2-aminopyridine, 3-aminopyridine, xanthosine, toluidine, picolinic acid, histidine, piperazine, N-methylpiperazine, 2-bis(2-hydroxyethyl)amino-2-(hydroxymethyl)-1,3-propanediol, uric acid, nitric acid, hydrochloric acid, perchloric acid, oxalic acid and ammonia may be incorporated.

For the same purpose, a salt of at least one pH adjuster selected from the group consisting of phosphoric acid, acetic acid, propionic acid, malonic acid, succinic acid, glutaric acid, adipic acid, maleic acid, fumaric acid, phthalic acid, citric acid, ethylenediamine, pyridine, 2-aminopyridine, 3-aminopyridine, xanthosine, toluidine, picolinic acid, histidine, piperazine, N-methylpiperazine, 2-bis(2-hydroxyethyl)amino-2-(hydroxymethyl)-1,3-propanediol, uric acid, nitric acid, hydrochloric acid, perchloric acid, oxalic acid and ammonia may be incorporated.

For the same purpose, an alkali metal hydroxide may be incorporated.

Further, as a pH buffering agent or the like, at least one quaternary ammonium hydroxide selected from the group consisting of tetraalkylammonium hydroxide, tetraethylammonium hydroxide and tetrapropylammonium hydroxide may be incorporated.

Further, as a viscosity-adjusting agent, polyethylene glycol or polypropylene glycol may be incorporated. The weight average molecular weight of the polyethylene glycol or the polypropylene glycol is preferably at most 1,000, more preferably at most 600, in view of water-solubility.

A slurry preparation method will be described below.

(Preparation of Slurry)

100 g of the $CeO_2$ fine particles ($CeO_2$ crystal powder) obtained in the above Preparation Example 19 was added to about 800 mL of distilled water, and 0.1 mol/L nitric acid was gradually added thereto with stirring to adjust a pH 4.0, and distilled water was further added so that the total volume was 1 L, to prepare a slurry liquid A containing 10 mass % of $CeO_2$. Further, 100 g of the $CeO_2$ fine particles obtained in the above Preparation Example 24 was added to about 800 mL of distilled water, and 0.1 mol/L nitric acid was gradually added thereto with stirring to adjust a pH 4.0, and distilled water was further added thereto so that the total volume was 1 L, to prepare a slurry liquid B containing 10 mass % of $CeO_2$.

A pH adjusting agent and a dispersing agent were added to the liquid solution A or B as shown in Table 4, followed by wet pulverization by a wet jet mill, and coarse particles were removed by centrifugal separation to prepare slurries in Preparation Examples 30 to 34. In Table 4, in the column "$CeO_2$", the content of the $CeO_2$ fine particles in the slurry is indicated. The pH adjusting agent was 0.1 mol/L nitric acid or 0.5 mol/L ammonia water. The dispersing agent was ammonium polyacrylate. Further, the diameter of the particles dispersed in the slurry i.e. $D_{50}$ was measured by a laser scattering particle size distribution meter and as a result, a good dispersion was obtained in each of Preparation Examples 30 to 34 as is evident from Table 4.

TABLE 4

| | Slurry liquid | $CeO_2$ (mass %) | Dispersing agent (mass %) | pH adjusting agent | Slurry pH | $D_{50}$ (nm) |
|---|---|---|---|---|---|---|
| Prep. Ex. 30 | A | 1.0 | 0.1 | Nitric acid | 4.0 | 120 |
| Prep. Ex. 31 | A | 1.0 | — | Nitric acid | 4.0 | 160 |
| Prep. Ex. 32 | A | 1.0 | 0.1 | Ammonia water | 8.5 | 120 |
| Prep. Ex. 33 | A | 3.0 | 0.1 | Nitric acid | 4.0 | 150 |

TABLE 4-continued

| Slurry liquid | CeO$_2$ (mass %) | Dispersing agent (mass %) | pH adjusting agent | Slurry pH | D$_{50}$ (nm) |
|---|---|---|---|---|---|
| Prep. Ex. 34 | B | 1.0 | 0.1 | Nitric acid | 4.0 | 140 |

Further, 450 g of the CeO$_2$ fine particles obtained in Preparation Example 19 was added to about 2 L of distilled water, then 4.5 g of ammonium polyacrylate as a dispersing agent was added thereto, followed by stirring, then a dispersion was prepared by an ultimizer, and coarse particles were removed by filtration by a filter. Then, distilled water was added to prepare a slurry liquid C having a solid content (CeO$_2$ fine particles content) of 6 mass %.

Separately, slurry liquids D1, D2, D3, D4 and D5 were prepared, containing polyoxypropylene diamine (Tradename: polyetheramine) manufactured by BASF, having a weight average molecular weight of 230, propylene glycol, ethylene glycol and a polyethylene glycol having a weight average molecular weight of 300 in the proportion represented by mass % in columns of PEA, PG, EG and PEG in Table 5.

TABLE 5

| Slurry liquid | PEA | PG | EG | PEG |
|---|---|---|---|---|
| D1 | 10 | 0 | 0 | 0 |
| D2 | 10 | 40 | 0 | 0 |
| D3 | 10 | 0 | 40 | 0 |
| D4 | 10 | 0 | 0 | 20 |
| D5 | 10 | 0 | 0 | 40 |

The slurry liquid C was mixed with each of the slurry liquids D1, D2, D3, D4 and D5 in a ratio of 50:50 to prepare slurries in Preparation Examples 35, 36, 37, 38 and 39, having a solid content of 3 mass %. D50 of the slurries in Preparation Examples 35, 36, 37, 38 and 39 was measured by a laser scattering particle size distribution meter and as a result, it was 110 nm, 115 nm, 120 nm, 118 nm and 122 nm, respectively.

As a polishing pad used when the principal plane of a circular glass plate is polished by using a slurry obtained in such a manner, a polishing pad made of a polyurethane foam having a Shore D hardness of from 45 to 75, a compressibility of from 0.1 to 10% and a density of from 0.5 to 1.5 g/cm$^3$, a polyurethane foam having a Shore A hardness of from 30 to 99, a compressibility of from 0.5 to 10% and a density of from 0.2 to 0.9 g/cm$^3$, or a polyurethane foam having a Shore A hardness of from 5 to 65, a compressibility of from 0.1 to 60% and a density of from 0.05 to 0.4 g/cm$^3$, may, for example, be mentioned.

The Shore D hardness and the Shore A hardness are respectively measured by a method of measuring the durometer A hardness and D hardness of a plastic as separated in JIS K7215.

Further, the compressibility (unit: %) is measured as follows. Namely, a polishing pad was cut into an appropriate size to prepare a sample. The thickness to of the sample when a load of a stress of 10 kPa is applied to the sample in a non-load state for 30 seconds is measured by a Schopper type thickness measuring apparatus. Then, the thickness $t_1$ of the sample when a load of a stress of 110 kPa is immediately applied to the sample in a state where the thickness is $t_0$, for 5 minutes, is measured. From these values $t_0$ and $t_1$, $(t_0-t_1)\times 100/t_0$ is calculated and regarded as the compressibility.

The polishing pressure at the time of polishing the principal plane is typically from 0.5 to 30 kPa.

The present invention provides a method capable of polishing the principal plane of a glass substrate with high precision without using colloidal silica, but the method may comprise a step of polishing the principal plane using a colloidal silica.

The magnetic disk of the present invention is characterized by using, as the substrate, a glass substrate produced by the production method of the present invention, and it is produced by a known method, for example, by laminating a plurality of layers including a magnetic layer to be a recording layer on the glass substrate.

Now, the present invention will be described in further detail with reference to Examples. However, it should be understood that the present invention is by no means restricted to such specific Examples.

EXAMPLE 1

A CeO$_2$ crystal powder (crystallite diameter: 25 nm) was prepared in the same manner as in the above Preparation Example 5 except that the heat treatment temperature (crystallization temperature) was 700° C. and the heat treatment time was 32 hours. The high pressure dispersion treatment was carried out by using an ultimizer dispersion treatment apparatus HJP-25005 manufactured by Sugino Machine Limited, and the crystallite diameter measurement was carried out by using an X-ray diffraction apparatus RINT2000 manufactured by Rigaku Corporation.

220 g of the above CeO$_2$ crystal powder, 880 mL of pure water and 2.2 g of ammonium polyacrylate were put in a container with a lid and mixed, followed by dispersion treatment for 72 hours by a ball mill using zirconia balls having a diameter of 0.5 mm. Then, the mixture was diluted with pure water to obtain a slurry having a CeO$_2$ crystal powder content of 1 mass %.

With respect to the slurry, D$_{50}$ of the particles in the slurry was measured by a UPA laser diffraction type particle size distribution measuring apparatus manufactured by NIKKISO CO., LTD. and was 68 nm.

Using the above slurry, the principal plane of a circular glass plate was polished as follows.

A silicate glass plate formed by float process was prepared, which was processed into a doughnut-type circular glass plate (a circular glass plate having a circular hole at its center) from which a glass substrate having an outer diameter of 65 mm, an inner diameter of 20 mm and a thickness of 0.635 mm would be obtained. The inner and outer peripheral edge surfaces were ground by diamond abrasive particles, and the upper and lower surfaces of the glass plate were lapped by alumina abrasive particles.

Then, the inner and outer peripheral edge surfaces were chamfered with a chamfer width of 0.15 mm and a chamfer angle of 45°.

After the inner and outer peripheral edge surfaces were processed, mirror finish processing was carried out on the edge surfaces by brush polishing using the cerium oxide slurry as a polishing compound and using a brush as a polishing tool. The processing amount was 30 μm by the removed amount in the radius direction.

Then, upper and bottom principal planes were polished by a double side polisher using a cerium oxide slurry (cerium oxide average particle size: about 1.1 μm) as a polishing compound and using a urethane pad as a polishing tool. The processing amount was 35 μm in total in the direction of the thickness between the upper and lower principal planes.

Further, the upper and lower principal planes were polished by a double side polisher using, as a polishing compound, cerium oxide (average particle size: about 0.2 μm) having an average particle size smaller than that of the above cerium oxide and using a urethane pad as a polishing tool. The processing amount was 1.6 μm in total in the direction of the thickness between the upper and lower principal planes.

The principal plane of the circular glass plate thus prepared was observed by an atomic force microscope manufacture by Veeco Instruments and as a result, the surface roughness Ra was 0.484 nm.

The principal plane of the circular glass plate was polished using a urethane polishing pad NP025 manufactured by FIL-WEL CO., LTD. as a polishing tool and using the above slurry as a polishing compound, under a polishing pressure of 14.7 kPa at a carrier circumferential speed of 14 m/min. As a result, Ra was 0.241 nm and Wa was 0.135 nm. The removed amount was 0.48 μm.

EXAMPLE 2

A slurry was prepared in the same manner as in the above Preparation Example 36 except that the $CeO_2$ crystal powder used in Example 1 was used as the $CeO_2$ fine particles.

Further, a circular glass plate of which the surface roughness Ra of the principle plane was 0.484 nm was prepared in the same manner as in Example 1.

The principal plane of the circular glass plate was polished using a urethane polishing pad NP125 manufactured by FIL-WEL CO., LTD. as a polishing tool and using the above slurry as a polishing compound, under a polishing pressure of 12 kPa at a carrier circumferential speed of 14 m/min. As a result, Ra was 0.164 nm, the roll-off was 31 nm, and the removed amount was 0.60 μm. The roll-off is the amount of sagging at the edge portion in a case of obtaining a regression line at a portion on the principal plane of from 2.5 to 5 mm inside the edge of the glass substrate, and is preferably at most 100 nm, more preferably at most 50 nm.

The present invention is applicable to production of a glass substrate for a magnetic disk.

The entire disclosures of Japanese Patent Application No. 2006-125475 filed on Apr. 28, 2006 and Japanese Patent Application No. 2006-262513 filed on Sep. 27, 2006 including specifications, claims, drawings and summaries are incorporated herein by reference in their entireties.

What is claimed is:

1. A method for producing a glass substrate for a magnetic disk by polishing a circular glass plate, which comprises polishing the circular glass plate using a slurry containing a $CeO_2$ crystal powder, wherein the $CeO_2$ crystal powder is prepared by:
   (1) obtaining a melt containing from 5 to 50 mol % of $CeO_2$, from 10 to 50 mol % of at least one alkaline earth metal oxide selected from the group consisting of MgO, CaO, SrO and BaO in total, and from 30 to 75 mol % of $B_2O_3$, by heating said composition containing $CeO_2$ to a temperature from 1200 to 1500° C.;
   (2) quenching the melt to obtain an amorphous material;
   (3) subjecting the amorphous material to heat treatment at from 650 to 850° C. to obtain a $CeO_2$ crystals-precipitated amorphous material; and
   (4) subjecting the $CeO_2$ crystals-precipitated amorphous material to acid treatment to separate and extract the $CeO_2$ crystal powder from the $CeO_2$ crystals-precipitated amorphous material;

wherein the median diameter of the particles in the slurry is from 10 to 300 nm as measured by dynamic light scattering method.

2. The method for producing a glass substrate for a magnetic disk according to claim 1, wherein in the melt, the ratio of the content of $CeO_2$ represented by mol % to the sum of the content of the alkaline earth metal oxide(s) and the content of $B_2O_3$ represented by mol % is from 5:95 to 50:50.

3. The method for producing a glass substrate for a magnetic disk according to claim 1, wherein in the melt, the ratio of the content of the alkaline earth metal oxide represented by mol % in the case of only one oxide or the total content of the alkaline earth metal oxides represented by mol % in the case of at least two oxides, to the content of $B_2O_3$ represented by mol %, is from 20:80 to 80:20.

4. The method for producing a glass substrate for a magnetic disk according to claim 1, wherein the amorphous material is flaky or fibrous.

5. The method for producing a glass substrate for a magnetic disk according to claim 1, wherein the $CeO_2$ crystal powder has an average particle size of from 5 to 50 nm as measured by X-ray method.

6. The method for producing a glass substrate for a magnetic disk according to claim 1, wherein the slurry has a content of the $CeO_2$ crystal powder of from 0.1 to 5% represented by mass percentage.

7. The method for producing a glass substrate for a magnetic disk according to claim 1, wherein the slurry contains water.

8. The method for producing a glass substrate for a magnetic disk according to claim 1, wherein the slurry has a pH of from 5 to 12.

9. The method for producing a glass substrate for a magnetic disk according to claim 1, wherein the slurry contains a water-soluble organic polymer having amino groups or amine salt groups.

10. The method for producing a glass substrate for a magnetic disk according to claim 9, wherein the water-soluble organic polymer having amino groups is at least one water-soluble organic polymer selected from the group consisting of a polyamide amine, a polyetheramine and an aliphatic polyamine.

11. The method for producing a glass substrate for a magnetic disk according to claim 1, wherein the slurry contains an alkali metal hydroxide.

12. The method for producing a glass substrate for a magnetic disk according to claim 1, wherein the slurry contains at least one quaternary ammonium hydroxide selected from the group consisting of tetraethylammonium hydroxide and tetrapropylammonium hydroxide.

13. The method for producing a glass substrate for a magnetic disk according to claim 1, wherein in the step of polishing the circular glass plate, the polishing pressure is from 0.5 to 30 kPa.

14. The method for producing a glass substrate for a magnetic disk according to claim 1, wherein the melt is obtained by heating a composition containing $CeO_2$ to a temperature from 1200 to 1500° C. while controlling the oxygen partial pressure and oxygen flow rate.

15. The method for producing a glass substrate for a magnetic disk according to claim 1, wherein the melt is obtained by heating a composition containing $CeO_2$ to a temperature from 1300 to 1500° C.

* * * * *